Feb. 17, 1970  G. M. SESSLER ET AL  3,496,461
METHOD OF MEASURING THE VOLUME RESISTIVITY OF THIN, SOLID
DIELECTRIC MATERIAL UTILIZING THE DECAY RATES OF A NUMBER
OF MEASURED DECAY INTERVALS
Filed May 25, 1967  2 Sheets-Sheet 1

INVENTORS G. M. SESSLER
J. E. WEST
BY G. E. Hirsch Jr.
ATTORNEY

United States Patent Office 3,496,461
Patented Feb. 17, 1970

3,496,461
METHOD OF MEASURING THE VOLUME RESISTIVITY OF THIN, SOLID DIELECTRIC MATERIAL UTILIZING THE DECAY RATES OF A NUMBER OF MEASURED DECAY INTERVALS
Gerhard M. Sessler, Murray Hill, and James E. West, Plainfield, N.J., assignors to Bell Telephone Laboratories, Incorporated, Murray Hill and Berkeley Heights, N.J., a corporation of New York
Filed May 25, 1967, Ser. No. 641,248
Int. Cl. G01r 27/02
U.S. Cl. 324—62                    2 Claims

ABSTRACT OF THE DISCLOSURE

Heretofore, measures of volume resistivity of dielectric materials in excess of approximately $10^{18}$ ohm centimeters have been unavailable because of instrumentation shortcomings. Accurate measurements above this limit may be made by initially polarizing a film, preferably at an elevated temperature, and thereafter measuring the time constant of charge decay. Measurements of the charge decay permit a direct determination of volume resistivity to values well in excess of $10^{18}$ ohm centimeters.

BACKGROUND OF THE INVENTION

This invention relates to a method of measuring an important property of dielectric materials—namely, the volume resistivity of such materials, over a range and with an accuracy heretofore unattainable.

Field of the invention

Dielectric materials in the form of thin films of various polyesters, such as the one known by the brand name "Mylar," various fluorocarbons, such as the one available commercially under the brand name "Teflon," various polycarbonate resins, or the like, are used widely in a variety of electronic transducers, for the fabrication of capacitors, and for similar applications. In a typical electronic transducer, such as an electrostatic microphone or earphone, a thin film of such a material is employed as the vibrating diaphragm. To avoid the need for external bias, the diaphragm foil may be permanently polarized. Thin films of the material, typically films 0.25 to 0.5 mil in thickness, exhibit the necesary dielectric properties to support polarization for long periods of time. Yet, the response of the films to applied polarization and the permanency of the polarization is a variable dependent largely on the volume resistivity of the material. It is thus essential that the volume resistivity of a material, defined as the proportionality factor characteristic of the substance which is proportional to the resistance that a volume of the substance offers the passage of electricity, be accurately determined in order that apparatus using it can be properly designed. Modern materials of the sorts noted above exhibit extremely high volume resistivities in excess of $10^{18}$ ohm centimeters. Unfortunately, no instruments or techniques are known for providing any measure of resistance of such magnitudes.

Prior art methods

Measurements of the volume resistivity of dielectric material have heretofore been made using conventional "ohmmeter" techniques. Thus, a controlled voltage is applied across the material and the resulting flow of current is measured. The ratio of the two denotes volume resistivity. Such a technique is effective so long as the resistivity is not too high. Typically, measurements of volume resistivity of, but not greater than, $10^{18}$ ohm centimeters have been attained. This upper limit apparently stems from an inability to measure the minute currents involved from the application of controllable potentials. Obviously, extremely sensitive instruments are required to obtain a measurement of this magnitude. Consequently, meaningful values above this level and in particular differences in resistance value above this magnitude are virtually impossible to obtain. It is for this reason that handbook values of volume resistivity for thin film dielectric materials indicate merely that for some materials the volume resistivity is "in excess of $10^{18}$ ohm centimeters."

SUMMARY OF THE INVENTION

These difficulties are overcome in accordance with the present invention by abandoning the traditional technique of relating voltage to current within a dielectric material and, instead, observing the decay rate of surface charge supported by the dielectric material. As will be shown, the decay rate is a function of volume resistivity; volume resistivity may be directly obtained from the rate of surface charge decay.

In accordance with a preferred form of the invention, a dielectric material such as a thin film of polyester, fluorocarbon, polycarbonate, or like material is initially polarized to develop a relatively long-lived homocharge in the material. The decay of the homocharge is thereupon observed and measured. The time for the surface charge to decrease by a fixed factor supplies sufficient information from which to ascertain the volume resistivity of the material. By this technique, accurate measurements have been obtained in excess of $10^{20}$ ohm centimeters with a high degree of sample-to-sample reliability. The method of measuring volume resistivity of thin film solid dielectric materials as thus outlined has been found to be of significant importance in the development of sensitive electrostatic transducer elements and the control of sensitive capacitor elements.

Since it has been observed that a charge of such material decays at an extremely slow rate—on the order of months or years—it is in accordance with the invention to elevate the temperature of the material in order to accelerate charge decay. For the same reason, the initial charge is preferably developed at an elevated temperature.

BRIEF DESCRIPTION OF THE DRAWINGS

A more complete understanding of the invention may be obtained from the following detailed description with reference to the accompanying drawings in which.

DETAILED DESCRIPTION OF THE INVENTION

Figure 1:
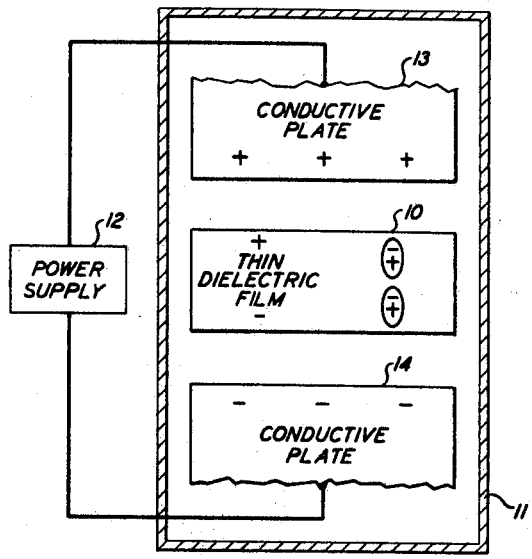
FIG. 1 is an illustration of a typical arrangement for developing a controlled charge on a dielectric material.

Before discussing the measuring technique of the present invention in detail, it is believed helpful to review briefly several fundamental relations.

Volume resistivity, $r$, of an ohmic conductive material is a specific property of the material. It is generally defined as being equal to the resistance of a right cylindrical conductor, $R$, multiplied by its cross-sectional area, $A$, and divided by its length, $l$. It is defined by the expression:

$$r = \frac{RA}{l} \quad (1)$$

and is expressed in ohm centimeters. Being a property of the material, it is largely responsible for the permanency or life of electrical charges supported by the material. Thus, if the volume resistivity of a material is sufficiently high, a thin film of material with an appropriate dielectric constant may be permanently charged or polarized. When thus charged, the material is commonly referred to as an "electret."

Polarization of the film can consist of both hetero- and homocharges. The heterocharge consists of dipoles which are aligned by an applied field; its external field has the same polarity as the forming field. The homocharge consists of a positive space charge on one side of the film and a negative space charge on the other side. Homocharges exist because electrons are relocated in the dielectric material, that is, electrons migrate between the surfaces of the film during the formation process. The polarity of the external field produced by a homocharge is opposite to that of the forming field. Hence, the fields caused by hetero- and homocharges have opposite directions. Polyester, fluorocarbon, and polycarbonate films typically exhibit fields corresponding to a homocharge, i.e., the homocharge is the prevailing charge.

For film electrets, the decay of a surface charge is a function of volume resistivity, or its reciprocal, its conductivity, and the dielectric constant of the material. Assuming charges to be present on both surfaces of a film, the time constant $\tau$ of the decay, defined as the time it takes a charge to decay by a value equal to $1/e$ of its initial value, or approximately 0.37 where $e$ represents the natural logarithm base, may be related to the resistivity $r$ by $$\tau = RC = \frac{r\epsilon}{4\pi} \quad (2)$$

where $\epsilon$ is the dielectric constant and $R$ and $C$ are the resistance and capacitance of the film, respectively, measured with the film placed between two conductive plates without an air gap. In practice, the time constant may be determined by measuring the decay of surface charge as a function of the time necessary for the charge to decay by a predetermined value. Solving Equation 2 for resistivity, $r$, one obtains $$r = \frac{4\pi\tau}{\epsilon} = K \cdot \tau \quad (3)$$

where $K$ represents the constant $4\pi/\epsilon$. Volume resistivity is thus proportional to the time constant of decay, i.e., to the decay rate. It is thus possible to determine the volume resistivity by measurement of the time constant of the decay. Conveniently, volume resistivity may be determined by multiplying the measured charge decay by the constant $K$.

Figure 3:
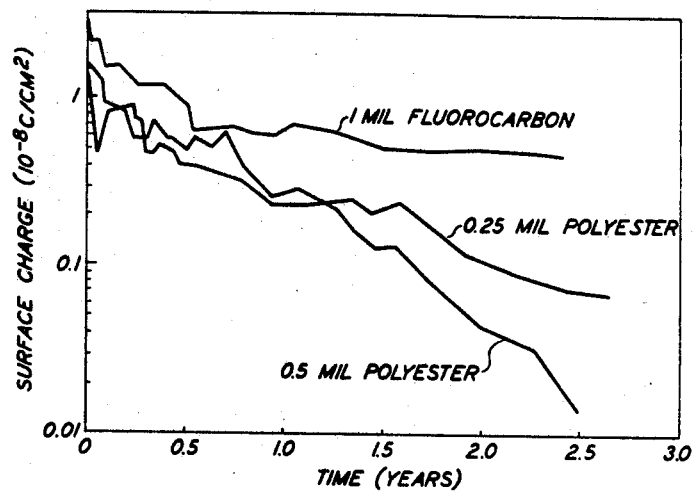
FIG. 3 depicts the variation of surface charge of several electret films at room temperature.

The decay of surface charge of film electrets as a function of time at room temperature is shown in FIG. 3 for several polyester and fluorocarbon electrets. The charges exhibit a somewhat erratic behavior during the first month of life, probably due to charge rearrangement after the polarization process. After this period, the charge decay is more monotonic. For polyesters, the decay is relatively exponential with a time constant of about one year. For fluorocarbon, the time constant increases from about one and one-half years to about ten years. Thus, charge decay is non-exponential for many thin film materials (see FIG. 3), i.e., Ohm's law relationships do not apply.

In accordance with the invention, charge decay is measured and used to produce a direct determination of the volume resistivity of a thin film of dielectric material. The technique, which takes into account the non-exponential character of charge decay in thin film materials, is effective up to values which cannot be measured accurately by other methods. For example, the volume resistivity of th polyester films shown in FIG. 3 is found to be $10^{20}$ ohm centimeters at room temperature, as compared to the value "larger than $10^{18}$ ohm centimeters" given in the literature.

Preparatory to measuring the volume resistivity of a thin film dielectric material, it is thus in accordance with the invention to polarize the film. A suitable procedure for polarizing a dielectric material is shown schematically in FIG. 1. The film 10 is heated to a temperature of approximately 150 degrees centigrade (polyester) or 230 degrees centigrade (fluorocarbon) in an oven 11, or the like, and exposed to a voltage of about 4 kilovolts, developed by power supply 12. Conveniently, the voltage is applied between two parallel conductive plates 13 and 14 separated from the film by an airgap of approximately 2 millimeters. The film is then allowed to cool in the D-C field. After this procedure, the film exhibits a polarization, both of hetero- and homocharge, as indicated. The airgap is necessary to prevent destructive sparking. Another method of preventing sparking is to interpose the film between two layers of dielectric material such as mica and to place this sandwich between the conductive plates without an airgap. In this case a higher polarizing voltage may be used. The homocharge in the film is then maximized, for example, by reheating to encourage dissipation of the heterocharge. Preferably, a charge technique which initially produces essentially a pure homocharge of relatively long life is employed. Techniques for forming homocharge electrets by both methods are well known in the art. See, for example, H. H. Wieder and S. Kaufman, "Plastic Electrets," Journal of Applied Physics, February 1953, pp. 156–161.

Figure 2:
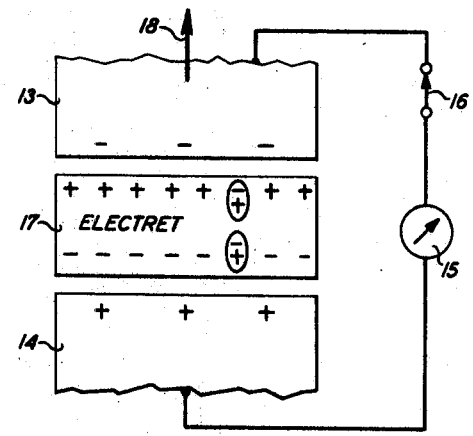
FIG. 2 is a schematic illustration of the manner in which the decay of charge is measured as a function of time.

The decay of applied homocharge is then measured, using any conventional method. For example, an induction technique which employs a ballistic galvanometer 15 connected by switch 16, as shown in FIG. 2, may be used. One conductive plate, e.g., 13, is rapidly removed, as indicated by arrow 18, within a time much shorter than the time constant of the galvanometer. The deflection of galvanometer 15 is proportional to the charge induced in the conductive plates. For calibration, a capacitor with a known charge may be discharged through the galvanometer. Thus, the relationship between charge and deflection can be determined, making possible the measurement of the induced charge. At least two such measurements define the decay rate. In practice several measurements are made, the better to define the decay characteristics.

Because of finite airgaps between the surfaces of the metal plates and the dielectric film, the induced charge $q_i$ is always smaller than the surface charge $q$ of the film. The relation between $q_i$ and $q$ is $$q_i = -qD'/(D + \epsilon d) \quad (4)$$

where $D$ and $d$ are the thicknesses of the film and air layers, respectively, $D'$ is the separation of the charges on the film and $\epsilon$ is the dielectric constant of the film. The airgap $d$ can be determined by measuring the capacitance of the system.

Due to the slow charge decay of electrets, measurement of the time dependence of surface charges at room temperature would have to be made over a long period of time in order to determine the time constant of the decay. In accordance with the invention, time constants are preferably determined at elevated temperatures of the film and the results extrapolated to room temperature. Measurement of at least two different temperatures above room temperature is sufficient. Extrapolation is facilitated by expressing time constant $\tau$ on a logarithmic scale and temperature on an inverse scale in degrees Kelvin. It has also been found helpful to precondition a film by temperature cycling after polarization but prior to measurement.

Figure 4:
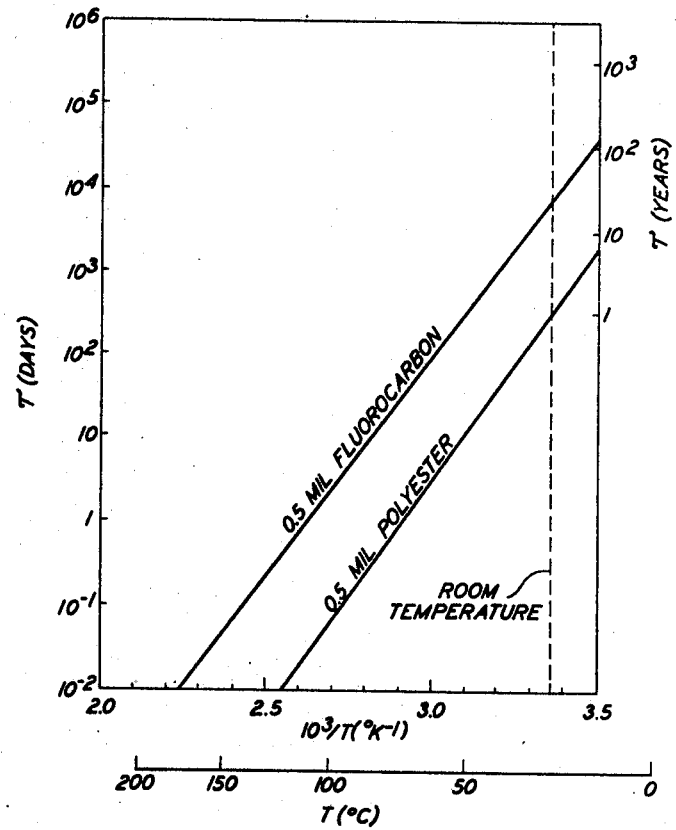
FIG. 4 illustrates variations in surface charge of polyester and fluorocarbon electrets as a function of temperature.

FIG. 4 illustrates typical decay characteristics for polyester and fluorocarbon dielectric films both at elevated temperatures and as extrapolated to room temperature. Time constant $\tau$ is plotted on a logarithmic scale against the inverse temperature $1/T$ in degrees Kelvin. With this choice of coordinator, linear extrapolation may be employed. It will be observed that the time constant at room temperature for a polyester material is approximately one year and that the time constant of a fluorocarbon ½ mil film electret is, at room temperature, approximately thirty years.

A number of variations in the manner in which the method of the invention is carried out will become obvious to those skilled in the art. For example, standard calibrated acoustic transducers may be employed. A dielectric film tested in a microphone may thus be measured directly as charge decays. This technique standardizes system constants and assures consistent results. Numerous other variations will readily occur to those skilled in the art.

What is claimed is:

1. The method of measuring the volume resistivity of thin solid dielectric material which comprises the steps of:
    polarizing a thin layer of solid dielectric material to develop a homocharge consisting of a positive space charge near one surface of said material and a negative space charge near the other surface of said material;
    measuring the rate of homocharge decay of said dielectric layer over each range of surface charge within which the rate of said decay remains essentially exponential; and
    utilizing the average decay rates of all such selected intervals to indicate the dependence of volume resistivity on the amount of homocharge present on said dielectric material.

2. The method of measuring the volume resistivity of thin solid dielectric material, which comprises the steps of:
    polarizing said solid dielectric material to develop a relatively long-lived homocharge in said material;
    detecting those intervals during which the average decay of said homocharge is essentially exponential; and
    selecting for use the average decay rates of all such intervals as an indication of the dependence of volume resistivity on the quantity of homocharge present on said dielectric material.

References Cited

Perlman, M. M., and J. L. Meunier: "Charge Decay of Carnauba Wax Electrets," in Journal of Applied Physics (36) 2, pp. 420–427, February 1965.

Wieder, H. H., and S. Kaufman: "Plastic Electrets," in Journal of Applied Physics (24) 2, pp, 156–161, February 1953.

Wiseman, G. G., and G. R. Feaster: "Experiments in the Polarization and Decay of Electrets," in Journal of Chemical Physics (26) 3, pp. 521–527, March 1957.

Fridkin, V. M., and I. S. Zheludev: "Photoelectrets and the Electro-Photographic Process" (translation from the Russian), New York, Consultants Bureau Enterprises, Inc., 1961, pp. 1, 2, 10, 11, 30, 31.

Gutmann, F.: "The Electret," in Reviews of Modern Physics 20 (3), pp. 457, 462, 470, July 1948.

Wiseman, G. G., and E. G. Linden: "Electrets," in Electrical Engineering, p. 870, October 1953.

EDWARD E. KUBASIEWICZ, Primary Examiner

J. M. HANLEY, Assistant Examiner